L. C. VANDERLIP.
MOTOR VEHICLE LOCK.
APPLICATION FILED MAY 22, 1922.

1,437,480.

Patented Dec. 5, 1922.

Inventor.
Louis C. Vanderlip

Patented Dec. 5, 1922.

1,437,480

UNITED STATES PATENT OFFICE.

LOUIS C. VANDERLIP, OF ELKHART, INDIANA.

MOTOR-VEHICLE LOCK.

Application filed May 22, 1922. Serial No. 562,608.

*To all whom it may concern:*

Be it known that I, LOUIS C. VANDERLIP, a citizen of the United States, residing in the city of Elkhart, county of Elkhart, Indiana, have invented certain new and useful Improvements in Motor-Vehicle Locks, of which the following is a specification.

My invention relates to automobile steering wheel locking devices, and especially to those having planetary gearing in the steering head.

An object of the invention is the production of a steering wheel locking device for a motor car having planetary gearing for actuating the steering post. Another object of the invention is the production of a simple, cheap and effective steering wheel locking device for motor cars of the Ford type in which the sun gear of the steering head planetary gearing may be meshed and demeshed independent of the movement of the steering wheel and its shaft.

A third object of the invention is the production of a simple device of the character described in which the sun gear of the planetary gearing of the steering head may be meshed and demeshed therewith independent of any axial movement of the steering wheel or its shaft, and in which a separate steering wheel may be applied to the wheel shaft. A fourth object of the invention is the production of a device of the character described having the minimum number of operative parts for application to cars now in use.

Other objects of the invention are mentioned and described herein.

Figure 1:
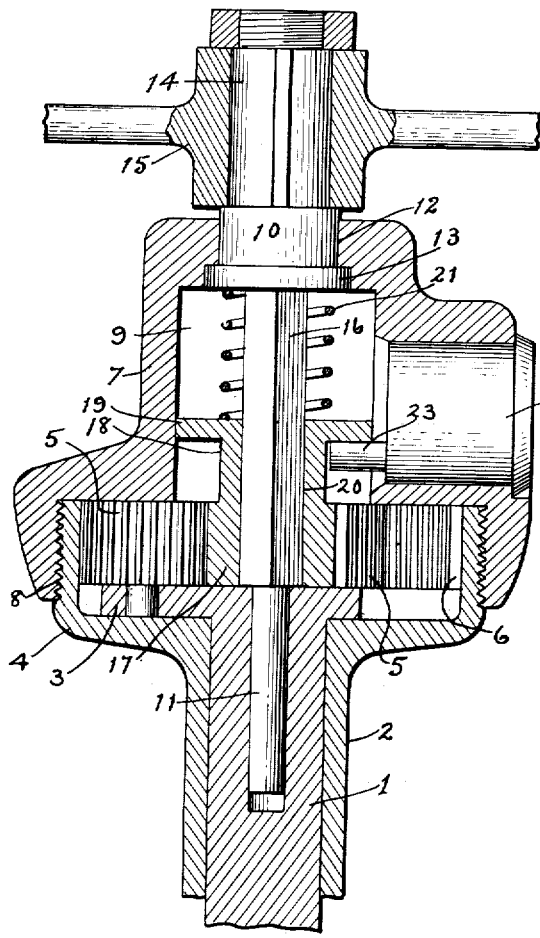
Figure 2:
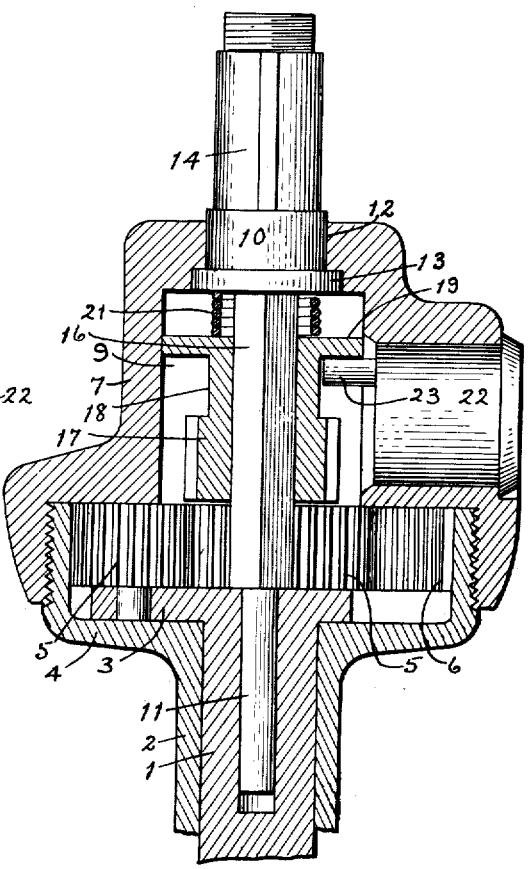
Figure 3:
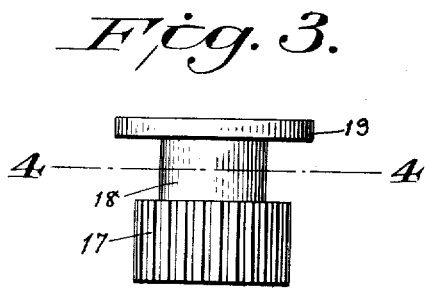
Figure 4:
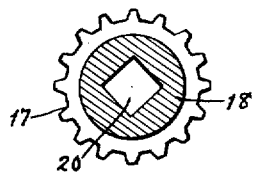

The preferred embodiment of my invention is illustrated in the accompanying drawing in which Figure 1 represents a vertical sectional view in which the planetary gearing is in the operative or driving position relatively to the sun gear thereof; Fig. 2 represents a similar view in which the sun gear of the planetary gearing is demeshed with the driven gears thereof; Fig. 3 is a side elevational view of the sun or driving gear of the planetary gearing; and Fig. 4 is a section taken on the line 4—4 of Fig. 3.

Similar numerals of reference indicate like parts throughout the several views on the drawing.

Referring to the details of the drawing, the numeral 1 indicates the steering post of a Ford motor car, which post is rotatably arranged within the fixed steering column 2, said post being provided with the usual head 3 at its top end, said head being disposed within the usual cylindrical cup-like lower casing 4 of the housing for the planetary gearing and secured to the top end of the column 2.

Numerals 5, 5 indicate the usual driven gears of the planetary gearing which gears are mounted upon the steering post head 3 in the usual manner, said pinions meshing, as usual, with the annular rack 6 formed on the inner periphery of the casing 4. The numeral 7 indicates a housing cap detachably threaded upon the casing 4 at 8, said cap being provided with a cylindrical chamber 9 which is open at its bottom end. The cap chamber 9 is traversed by the steering wheel shaft 10 which is arranged axially of the steering post 1, the lower cylindrical portion 11 of said shaft being journaled in the upper end of the steering post. The shaft 10 is cylindrical in formation adjacent its upper end to effect a bearing at 12 in the upper wall of the cap 7, and said shaft is provided also with the annular flange, or collar, 13 which engages the inner face of the cap to prevent upward movement and axial displacement of the shaft from its bearing in the steering post. The wheel shaft 10 is provided also with a cylindrical portion 14 disposed exteriorly of the cap 7 and upon which a steering wheel 15 may be detachably secured in any suitable manner. The shaft 10 is preferably polygonally formed at 16 intermediate the flange 13 and the portion 11 to carry the sun gear or driver pinion 17, said sun gear meshing, normally, with the driven gears 5, 5 of the planetary gears to effect a driving relation between the post 1 and the wheel 15.

The pinion 17 may be provided with a cylindrical extension 18, the upper end whereof may have the annular flange 19 mounted thereon, said flange fitting the bore of the chamber of the cap chamber 9 slidably. The pinion 17 and its extension 18 may be polygonally bored at 20 to receive the wheel shaft portion 16, upon which shaft portion said pinion is freely slidable, whereby the sun gear 17 may be demeshed and meshed with the driven gears 5, 5 of the planetary gearing by movement thereof into and out of the cap chamber 9. Normally, the gear 17 is held in mesh with the gears 5, 5 by a coil spring 21 which bears against the extension 18 and which may encompass the shaft portion 16, but demeshing of said gear may be readily effected by a key controlled and actuated lock 22 mounted in the cap 7, the key barrel whereof—not shown,—which is revoluble, is provided with a pin 23 which engages beneath the flange 19, said pin being operable through an arc of one hundred eighty degrees from a bottom to a top position, as indicated in Figures 1 and 2, respectively.

Obviously, when the gear 17 is elevated, as shown in Fig. 2, it is demeshed with the driven gears 5, 5 and the shaft 10 and wheel 15 then have no driving connection with the steering post 1, in which position said gear is held and releasably locked by the removal of the key from the lock 22.

I claim:

1. In a steering device for a vehicle the combination with a steering post, a housing gearing in said housing for actuating the steering post, of a cap for said housing; a mounted relatively to said post, planetary a wheel shaft rotatably mounted in said housing cap and fixed against lengthwise movement relative to said steering post; a pinion encompassing said wheel shaft and rotative therewith, said pinion being mounted for lengthwise movement on said shaft relatively to said steering post, whereby said pinion may be meshed and demeshed with said planetary gearing, and means for releasably locking said pinion in the demeshed position.

2. In a steering device for a vehicle the combination with a steering post, a housing mounted relatively to said post, planetary gearing in said housing for actuating the steering post, of a cap for said housing; a wheel shaft rotatably mounted in said housing cap; means for preventing endwise movement of said wheel shaft relative to said steering post; a pinion encompassing said wheel shaft and rotative therewith, said pinion being mounted for lengthwise movement on said shaft relatively to said steering post, whereby said pinion may be meshed and demeshed with said planetary gearing; and a steering member on said wheel shaft; and means for releasably locking said pinion in the demeshed position.

3. In a steering device for a vehicle the combination with a steering post, a housing mounted relatively to said post, planetary gearing in said housing for actuating the steering post, of a cap for said housing, said cap having a chamber; a wheel shaft rotatably mounted in said housing cap; means for preventing endwise movement of said wheel shaft relative to said steering post; a pinion encompassing said wheel shaft and rotative therewith, said pinion being mounted for lengthwise movement on said shaft relatively to said steering post and into and out of said housing cap chamber, whereby said pinion may be demeshed and meshed with said planetary gearing; and means for releasably locking said pinion in the demeshed position.

4. In a steering device for a vehicle the combination with a steering post, a housing mounted relatively to said post, a planetary gearing in said housing for actuating the steering post, of a cap for said housing; a steering wheel shaft rotatably mounted in said housing and fixed against lengthwise movement relative to the steering post, the lower end of said shaft being journaled in said steering post and another portion of said shaft being journaled in said housing cap; a pinion encompassing said wheel shaft and rotative therewith, said pinion being mounted for lengthwise movement on said shaft relatively to said steering post, whereby said pinion may be meshed and demeshed with said planetary gearing; and a key controlled lock mounted in said housing cap for demeshing said pinion with said planetary gearing.

5. In a steering device for a vehicle the combination with a steering post, a housing mounted relatively to said post, a planetary gearing in said housing for actuating the steering post, of a cap for said housing; a steering wheel shaft rotatably mounted in said housing and fixed against lengthwise movement relative to said steering post, the lower end of said shaft being journaled in said steering post and another portion of said shaft being journaled in said housing cap; a spring pressed pinion encompassing said wheel shaft and rotative therewith, said pinion being mounted for lengthwise movement on said shaft relatively to said steering post, whereby said pinion may be meshed and demeshed with said planetary gearing; and a key controlled lock mounted in said housing cap for demeshing said pinion with said planetary gearing.

6. In a steering device of the character described, in combination, a steering post; a housing mounted relatively to said post; driven gears in said housing for actuating said steering post; a cap for said housing; a wheel shaft mounted within said housing and axially of said steering post; means for preventing endwise movement of said wheel shaft relative to said steering post; a driver pinion encompassing said wheel shaft and rotative therewith, said pinion being mounted for lengthwise movement on said wheel shaft relatively to said steering post; and key controlled means mounted in said housing cap for actuating said driver pinion, whereby said pinion may be meshed and demeshed with said driven gears.

7. In a steering device for a vehicle the combination with a steering post, a housing mounted relatively to said post, a planetary gearing in said housing for actuating the steering post, of a cap for said housing; a steering wheel shaft rotatably mounted within said housing and fixed against endwise movement relative to said steering post, the lower end of said shaft being journaled in said steering post and another portion of said shaft being journaled in said housing cap; a driver pinion encompassing said wheel shaft and rotative therewith, said pinion being mounted for lengthwise movement on said wheel shaft relatively to said steering post, whereby said pinion may be meshed and demeshed with said driven gears; and means mounted in said housing cap for releasably locking said driver pinion in demeshed relation to said driven gears.

8. In a steering device of the character described the combination with a steering post, a housing mounted relatively to said post, driven gears in said housing for actuating said steering post, of a cap for said housing; a wheel shaft rotatably mounted within said housing, said shaft including an end portion journaled in said steering post and an intermediate polygonal portion disposed within said housing and said cap, said shaft being provided also with a stub-shaft portion adapted to have a steering wheel detachably mounted thereon; means for preventing endwise movement of said wheel shaft relative to said steering post; a driver pinion slidably mounted upon the polygonal portion of said wheel shaft and rotative therewith, whereby said pinion may be meshed and demeshed with said driven gears; and means mounted in said housing cap for releasably locking said driver pinion in demeshed relation to said driven gears.

9. In a steering device of the character described, in combination, a steering post; a housing mounted relatively to said post; driven gears in said housing for actuating said steering post; a cap for said housing; a wheel shaft mounted within said housing and axially of said steering post; means for preventing endwise movement of said wheel shaft relative to said steering post; a steering wheel detachably mounted on the upper end of said wheel shaft; a driver pinion encompassing said wheel shaft and rotative therewith, said pinion being mounted for lengthwise movement on said wheel shaft relatively to said steering post, whereby said pinion may be meshed and demeshed with said driven gears; and means mounted in said housing cap for releasably locking said driver pinion in demeshed relation to said driven gears.

In witness whereof I have hereunto affixed my signature this 18th day of May, 1922.

LOUIS C. VANDERLIP.

Certificate of Correction.

It is hereby certified that in Letters Patent No. 1,437,480, granted December 5, 1922, upon the application of Louis C. Vanderlip, of Elkhart, Indiana, for an improvement in "Motor-Vehicle Locks," an error appears in the printed specification requiring correction as follows: Page 2, line 20, claim 1, beginning with the word "gearing" strike out all to and including the word "planetary", line 22, and insert *mounted relatively to said post, planetary gearing in said housing for actuating the steering post, of a cap for said housing;* and that the said Letters Patent should be read with this correction therein that the same may conform to the record of the case in the Patent Office.

Signed and sealed this 16th day of January, A. D., 1923.

[SEAL.]

KARL FENNING,
*Acting Commissioner of Patents.*